July 24, 1962 — A. H. LACKIE — 3,045,497
PENDANT WHEEL BALANCER
Filed April 25, 1960 — 2 Sheets-Sheet 1

INVENTOR.
ARTHUR H. LACKIE.
BY
ATTORNEY

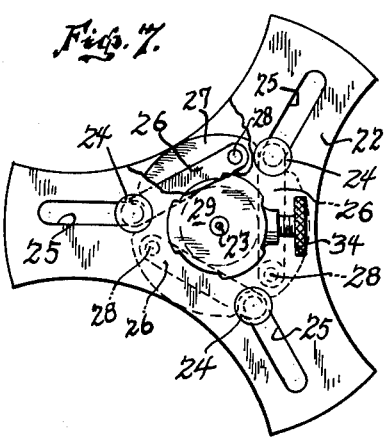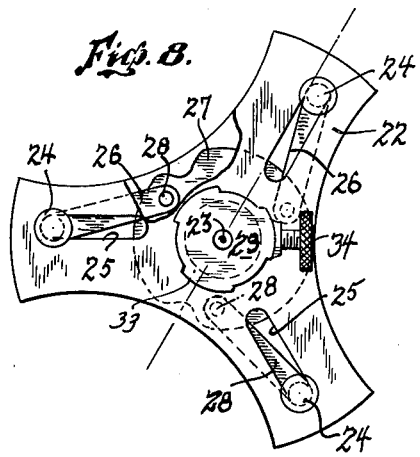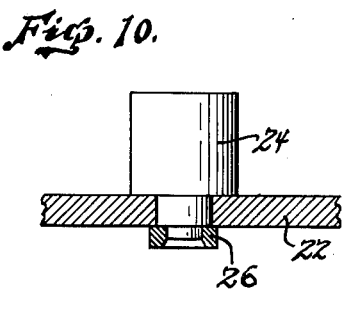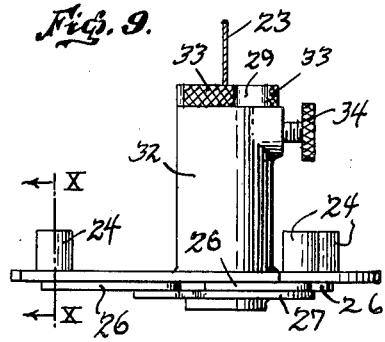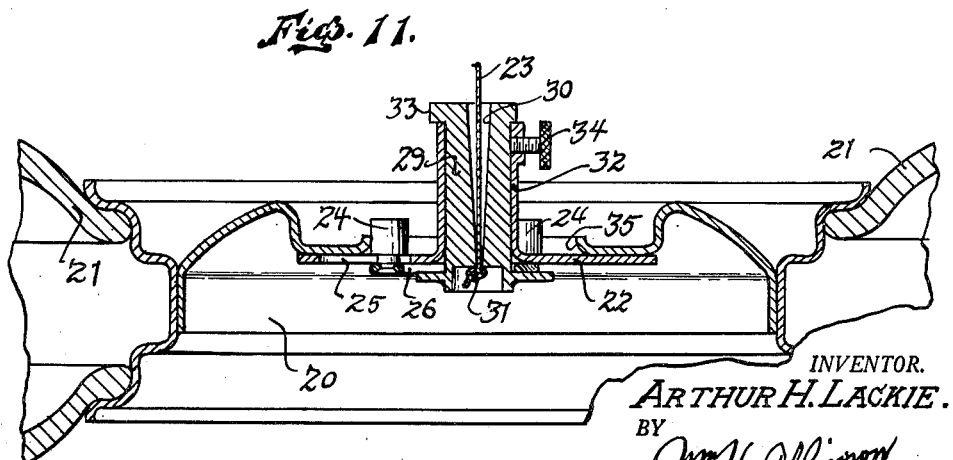
INVENTOR.
ARTHUR H. LACKIE.

United States Patent Office 3,045,497
Patented July 24, 1962

3,045,497
PENDANT WHEEL BALANCER
Arthur H. Lackie, Pacheco, Calif.
(434 19th Ave., San Francisco 21, Calif.)
Filed Apr. 25, 1960, Ser. No. 24,565
2 Claims. (Cl. 73—486)

My present invention relates to automobile wheel balancing, and more particularly to a pendant type wheel balancing device which may be operated manually in a simple and effective manner without the use of complicated speed and/or vibration sensitive devices.

The principal object of the invention is to provide a simple and inexpensive device that may be used by a garage mechanic in a practical manner and without requiring other complicated equipment.

Another object of the invention is to provide a practical, inexpensive and utilitarian device of simple form that may be employed by an individual in the balancing of automobile wheels by the addition of counter-weights in accordance with the generally accepted practice.

Another object of the invention is to provide an improvement in pendant type wheel balancing devices by which an automobile wheel to be balanced may be rapidly and accurately centered upon a pendant forming support.

Other objects and advantages will be in part evident to those skilled in the art and in part pointed out hereinafter in connection with the accompanying drawing, wherein there is shown by way of illustration and not of limitation a preferred embodiment of the invention.

Figure 1:
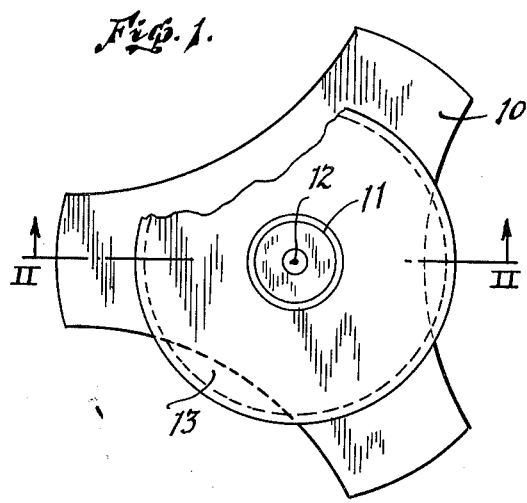
Figure 2:
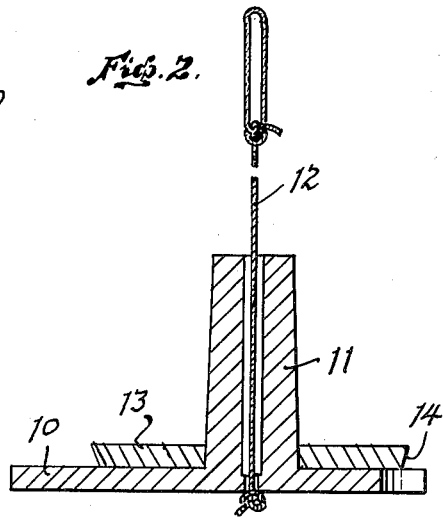
Figure 3:
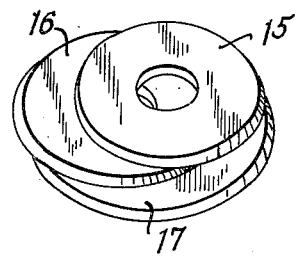
Figure 4:
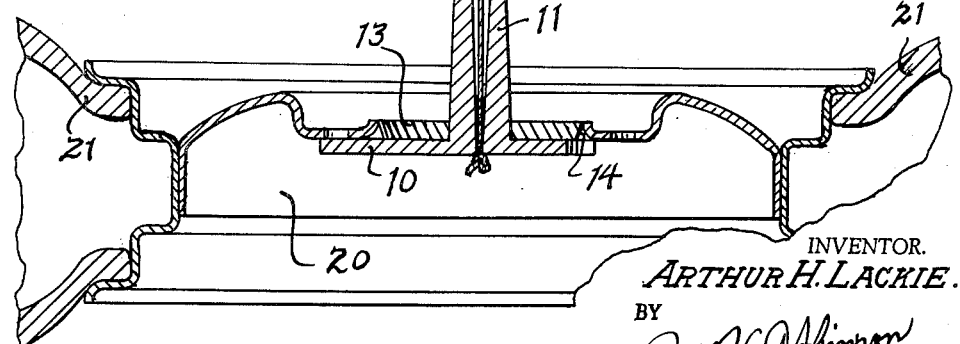

In the accompanying drawing, wherein like numerals refer to like parts throughout the several views:

FIGURE 1 is a top view of a simple form of the invention with a portion of one of the parts broken away, FIGURE 2 is a vertical sectional view taken along line II—II of FIGURE 1 looking in direction of arrows, FIGURE 3 is a perspective view showing a plurality of wheel centering discs, as employed with my invention, FIGURE 4 is a fragmentary vertical sectional view showing the device of FIGURE 1 as employed in balancing a conventional automobile wheel with tire.

Figure 5:
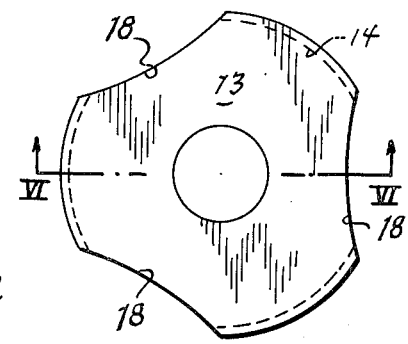
Figure 6:
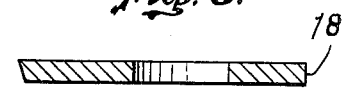

FIGURE 5 shows a modified form of wheel centering disc,

FIGURE 6 is a vertical sectional view taken along line VI—VI of FIGURE 5 looking in direction of arrows, FIGURE 7 is a top view of an improved form which the invention may take, with a portion broken away to reveal a detail of construction, FIGURE 8 is a view similar to FIGURE 7 showing the parts in another operative position, FIGURE 9 is a side view of the device as shown in FIGURE 8, FIGURE 10 is a detail view taken along line X—X of FIGURE 9 looking in direction of arrows, FIGURE 11 is a fragmentary vertical sectional view showing the device of FIGURES 7 and 8 as employed in balancing a conventional automobile wheel with tire.

In FIGURES 1 to 6 of the drawings I have illustrated a simple form of my invention which in its simplest form is comprised of only three major parts. These parts consist of a spider or wheel supporting member 10 having a central vertically extending cylindrical column 11 with a hole therethrough into which a suspension cord or cable 12 extends. In order to center the spider or wheel supporting member 10 centrally within a wheel to be balanced I provide a centering disc 13 having a chamfered periphery 14 that is removably mounted upon a cylindrical portion 11 of the wheel supporting spider 10. In FIGURE 3, I show three of the wheel centering discs, designated by the numerals 15, 16 and 17. Each of these discs have a central opening that is adapted to center them upon cylindrical column 11 of the support 10 when in use. The purpose of these different discs 15, 16 and 17 each having different diameters is to adapt the device to wheels having different axle accommodating openings. To facilitate the placing of these wheel centering discs 13, 15, 16 and 17 within the opening of a wheel I may, as shown in FIGURE 5, cut away one or more portions at the points 18.

When this particular embodiment of the invention is in use as shown in FIGURE 4 of the drawing it will be seen that when a wheel lifting force is applied to the suspension cord or cable 12 the wheel, here designated in its entirety by the numeral 20, will be raised from a supporting surface and thus suspended pendulum fashion upon the suspension cord. Now, if the wheel 20 with a tire 21 mounted thereupon is not in balance it will tend to tip in one direction or another depending upon where the wheel is the heaviest. In other words, the lighter side of the wheel will be the first to raise from any horizontally disposed supporting surface. Under these conditions the operator can then proceed to balance the wheel by the addition of compensating weights at the required points about the circumference of the wheel.

A more complicated embodiment of the invention is illustrated in FIGURES 7 to 11 of the accompanying drawing, wherein the numeral 22 designates a three arm or triangular spider that is adapted to be positioned beneath the bolt accommodating face of the automobile wheel in the manner suggested above in connection with the wheel supporting spider 10. In this arrangement the triangular spider 22 is adapted to be raised and held into an operative position by a suspension cord 23, which as in the former case will support the wheel undergoing balancing pendulum fashion. Instead of the wheel centering discs 13, 15, 16 and 17, I here employ three wheel centering pins 24 that are mounted to move radially in slots 25 formed in the three arms of the triangular spider 22. These centering pins 24 are moved along their radial paths by means of links or pitmans 26 that are connected at their inner ends to a crank forming disc 27 by pins 28. The crank forming disc 27 is formed as an integral part of an upstanding cylinder 29 which is provided with a flaring funnel-like central opening 30 through which the suspension cord or cable 23 is extended. As is more clearly shown in FIGURE 11, the suspension cord 23 is secured within the opening 30 by a knot 31 at its lower end. The cylindrical extension 29 is mounted to rotate within a cylindrical sleeve 32 carried by the spider 22 and it has knurled extensions 33 by which it may be turned relative to the triangular spider 22. When this cylindrical extension 29 is rotated the wheel centering pins 24 will move outwardly in equal degree and thus center the supporting spider 22 with respect to the wheel being balanced. A set screw 34 is provided upon the cylindrical sleeve 32 for securing the crank forming disc 27 in a fixed position with respect to the spider 22 when the pins 24 have each been brought into engagement with the central axle accommodating opening 35 of the wheel 20. A feature to be noted is that the engaged working sides of the slots 25 against which the pins 24 operate are disposed along lines extending radially with respect to the center of the spider 22.

While I have, for the sake of clearness and in order to disclose my invention so that the same can be readily understood, described and illustrated a specific form and arrangement, I desire to have it understood that this invention is not limited to the specific form disclosed, but may be embodied in other ways that will suggest themselves to persons skilled in the art. It is believed that this invention is new and all such changes as come within the scope of the appended claims are to be considered as part of this invention.

Having thus described my invention, what I claim and desire to secure by Letters Patent is:

1. In an automobile wheel balancing device, the combination of a wheel supporting spider having three arms with radially extending pin accommodating slots formed therein, said spider having an upstanding tubular hub at the center thereof, a suspension member upon which the upstanding tubular hub of said spider is rotatably mounted, said suspension member having a vertically extending central opening, a suspension cord extending downwardly through and secured centrally against removal at the lower end of said opening, a horizontally disposed supporting flange at the lower end of said suspension member, a wheel engaging pin mounted for radial movement in each of the slots formed in the arms of said spider, and a connecting link extending from each of said pins to an off-center point of connection with the supporting flange at the lower end of said suspension member, whereby said wheel engaging pins will move uniformly outward for engagement with the hub accommodating opening of the wheel to be balanced when said supporting member is rotated within the upstanding tubular hub of said spider.

2. The invention as set forth in claim 1, characterized by the fact that the vertically extending central opening of said suspension member is of flaring funnel-like form, whereby any unbalance in a wheel being tested will be indicated and located by the off-center position of said suspension cord at the upper end of the funnel-like opening in said suspension member.

References Cited in the file of this patent

UNITED STATES PATENTS

| | | |
|---|---|---|
| 2,478,477 | Graves | Aug. 9, 1949 |
| 2,481,256 | Sutton | Sept. 6, 1949 |
| 2,493,872 | Henry | Jan. 10, 1950 |
| 2,512,231 | Hart | June 20, 1950 |

FOREIGN PATENTS

| | | |
|---|---|---|
| 687,779 | Great Britain | Feb. 18, 1953 |